Sept. 7, 1937.   H. H. BATES ET AL   2,092,365
TRACTOR AND THE LIKE
Filed July 3, 1933   2 Sheets-Sheet 1

Inventors:
Harry H. Bates,
William O. Bates, Jr.
by Thos. A. Banning Jr.
Atty.

Sept. 7, 1937. H. H. BATES ET AL 2,092,365
TRACTOR AND THE LIKE
Filed July 3, 1933 2 Sheets-Sheet 2

Inventors:
Harry H. Bates
William O. Bates, jr.
by Thos. A. Banning
Atty.

Patented Sept. 7, 1937

2,092,365

UNITED STATES PATENT OFFICE 2,092,365

TRACTOR AND THE LIKE

Harry H. Bates and William O. Bates, Jr., Joliet, Ill.

Application July 3, 1933, Serial No. 678,910

3 Claims. (Cl. 305—9)

This invention has to do with improvements in tractors and the like, especially of the so-called crawler type. In this type of tractor there are generally provided two crawlers, one located at each side of the medial line of the tractor; and the traction is secured by driving these crawlers from a suitable power plant carried by the frame of the machine. It is also common practice to treat each crawler as a unit which is more or less self-contained, and these crawlers units are pivotally connected to the frame of the machine so that they may oscillate about transversely extending horizontal axes usually coincident with the rear or driving wheels of the crawler units. Such being the case, as the tractor progresses along the ground, each crawler is able to oscillate about such horizontally extending transverse axis, its front end swinging up and down with the irregularities of the surface of the ground.

It is desirable to provide means for so connecting the front end portions of the crawlers to the frame of the machine that any lateral forces coming on to the crawlers will be properly taken up without exerting excessive strain on the rear end connections of the crawlers to the tractor frame; and at the same time it is necessary to make such lateral strain connections that the full and free vertical swinging movements will not be interfered with. It is the main object of the present invention to provide means for accomplishing the above result.

More specifically, it is an object to provide an arrangement in which the lateral strain connection is mounted on or connected to the crawler frame with a pivotal connection so that the vertical oscillations are accommodated by a pivoting action, and to connect the crank arm from such pivotal connection to the frame of the tractor by a pin and slot connection so as to take up for angularity due to the vertical oscillations.

A further feature is to provide a very simple and rugged construction, and one which is well able to take care of the relatively large strains to which it is subjected in service; and at the same time to provide an arrangement such that ample provision may readily be made for lubrication of the pivotal connection to the crawler frame. In this connection it is a further object to make ample provision for taking up the end thrust to which the pivotal connection is necessarily subjected in service, and to ensure lubrication therefor.

A further feature is to provide a construction such that it can be built at small cost, and can be readily used in connection with well known forms of tractors.

Other objects and uses of the invention will appear from a detailed description of the same which consists in the features of construction and combinations of parts hereinafter described and claimed.

Figure 1:
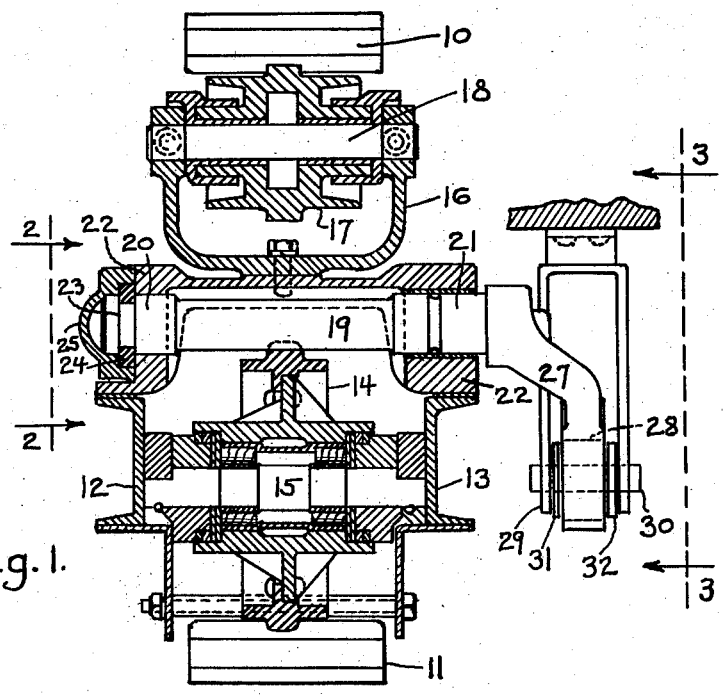
Figure 1 shows a cross-section through a typical construction of crawler having applied thereto a device involving the features of the present invention, the outwardly facing side of the crawler being at the left hand side of the figure.

In the drawings, Figure 1 shows a cross-section through a typical crawler, in which the top and bottom runs of the tread are shown at 10 and 11, respectively. This tread chain is of any standard or suitable construction, and the details thereof constitute no portion of the present invention. The crawler also includes the frame having the longitudinally extending channels 12 and 13, the usual end sprockets (not shown), and the usual idler wheels, one of which is shown at 14 for pressing down on the bottom tread or run of the crawler chain. This idler 14 is journalled on the cross pin 15 which is in turn connected to the side frame members 12 and 13 substantially as shown. The crawler is also provided with the upwardly extending bracket 16 which carries the roller 17 for supporting the top run of the crawler chain, said roller 17 being journalled on the cross pin 18 substantially as shown.

The frame 8 of the tractor proper is suitably carried by the crawler, the details of such connection not being shown, but being well understood in the art. This connection is such that the crawler is pivotally connected to the tractor frame generally at the rear end of the crawler on the shaft 9, so that the crawler frame is allowed to rock or swing up and down about a pivotal connection at the rear end. Such an arrangement is shown for example, in Letters Patent of the United States, No. 1,379,323, issued May 24, 1921, on the application of William Turnbull, to which patent reference is here made merely by way of illustration, and not for any purpose of limitation or otherwise.

With arrangements such as the foregoing in which the front end of the crawler is allowed to swing up and down, it is necessary to provide a suitable connection between the crawler frame and the tractor frame, so that lateral movements of the front end of the crawler are properly prevented, and so as to properly transmit the lateral forces from the crawler frame to the tractor frame. Such connection must also be such as not to interfere with the up and down swinging movements of the front end of the crawler with respect to the tractor frame.

Figures 2, 3:
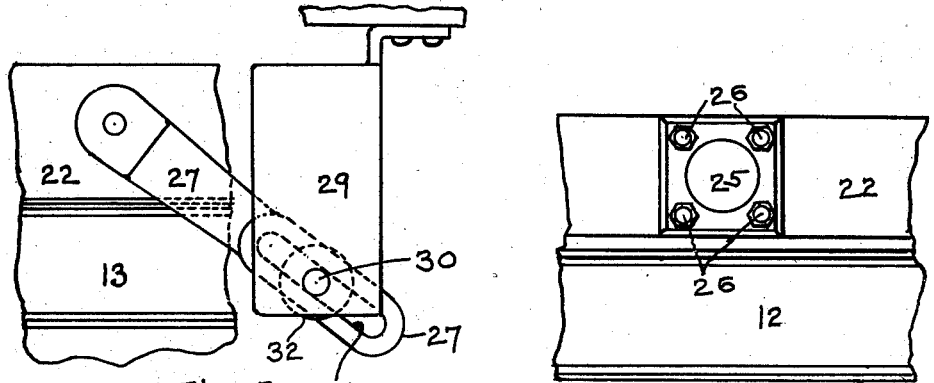
Figure 2 shows a fragmentary face view in detail of the outside face of the end cap for the rock shaft.
Figure 3 shows a fragmentary inside face view of the crawler, looking at the crank arm on the inner end of the rock shaft, and showing the connection of the same to the tractor frame.
Figure 4:
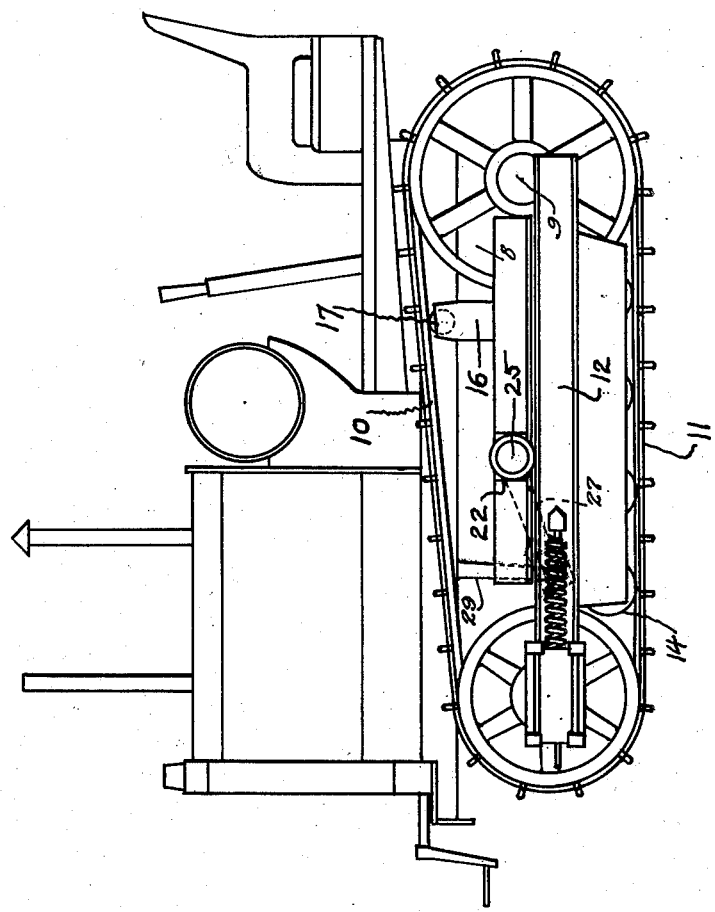
Figure 4 shows a side elevation of a tractor of the crawler type and embodying the features of the present invention.

In the present case we have provided a transversely extending rock shaft 19 which is journalled to the crawler frame in the bearings 20 and 21, said bearings being conveniently provided in the frame block 22 which is mounted on the upper edges of the channels 12 and 13 already referred to. At its outer end the rock shaft has the groove 23 which receives the thrust bearing ring 24. Said ring bears at its inner face against the block 22, and at its outer face it bears against the bearing cap 25 which is secured to the block 22 by means of the studs 26 (see Figure 2). As a result of the above arrangement, the rock shaft is permitted to rock freely, but is retained against end movement with respect to the crawler frame.

At its inner end the rock shaft carries the crank arm 27. This crank arm extends either forwardly or backwardly with respect to the general direction of the crawler frame, or in some cases it may extend directly downward or upward. Said crank arm has at its free end the slot 28. The tractor frame includes a portion or a bracket such as 29 which is rigid with respect to the tractor frame; and there is provided a cross-pin 30 which extends through said slot, said pin being connected to the tractor frame, and serving to provide a pin and slot connection between the crank arm and the tractor frame, such connection being laterally rigid with respect to the tractor frame itself. There are also preferably provided the washers 31 and 32 between the side faces of the end portion of the crank arm and the bracket so as to properly transmit such lateral thrust forces without undue wear or friction between the parts.

It will be seen that as the crawler oscillates up and down with respect to the main tractor frame, sufficient movement is provided for in the pin and slot connection referred to, and at the same time lateral forces and deflections are prevented by the end thrust bearing disclosed in the form of the ring 24. By locating this side-thrust arrangement relatively close to the front or oscillating end of the crawler, provision is made for the necessary vertical oscillations, and at the same time the necessary provision is made for preventing the lateral movements, and also for taking up the lateral forces.

While we have herein shown and described only one embodiment of the features of our invention, still we do not intend to limit ourselves thereto except as we may do so in the claims.

We claim:

1. The combination with a tractor having a frame and having a ground crawler device including a longitudinally extending crawler frame and a traction chain extending around the same, said crawler frame being pivotally connected to the tractor frame at the rear end thereof, whereby said ground crawler device is free to oscillate about a transverse horizontally extending axis adjacent to its rear end, of means for receiving and resisting lateral strains on said crawler, comprising a rock shaft journalled on the crawler frame and extending transversely thereof, a thrust bearing between the rock shaft and the crawler frame to resist endwise movement of the shaft with respect to the crawler frame, a crank arm on one end of said rock shaft, there being a slot shaped opening in the free end of said crank arm, and a connection between the free end of said crank arm and the tractor frame comprising a bifurcated bracket fixed to the tractor frame, a pin connecting the legs of the bifurcation, the free end of the crank arm being received between said legs with said pin passing through said slot shaped opening, substantially as described.

2. The combination with a tractor having a main frame and a ground crawler device including a longitudinally extending crawler frame and a traction chain extending around the same, said crawler frame being pivotally connected to the tractor adjacent to the rear end thereof, whereby said ground crawler device is free to oscillate about a transverse horizontal axis adjacent to its rear end, of means for receiving and resisting lateral strains on said crawler device, comprising a transversely extending rock shaft journalled on said crawler frame, means whereby said rock shaft resists endwise movement of itself relative to its journals, a crank arm on one end of said rock shaft, sliding means on the free end of said crank arm, and a connection device between said crank arm sliding means and the main frame such that said crank arm and said connection device form a lateral strain resisting means between said crawler frame and said tractor, substantially as described.

3. In a traction machine including a body portion having a frame, together with a crawler device having a longitudinally extending crawler frame and a traction chain extending around the same, and a pivotal connection between one end of the crawler frame and the body portion, whereby said crawler frame is free to oscillate about a transverse horizontal axis at said end of the crawler frame, of means for receiving and resisting lateral strains on said device, comprising a transversely extending rock shaft journalled on one of said frames, the journals of said rock shaft rigidly attached to said frame, means whereby said rock shaft resists endwise movement of its self relative to its journals, a crank arm on one end of said rock shaft, sliding means connected to the free end of said crank arm, and a connection device connecting said crank arm sliding means to the other of said frames to which the rock shaft is not journalled, whereby said crank arm and said connection device form a lateral strain resisting means between said crawler frame and said tractor frame, substantially as described.

HARRY H. BATES.
WILLIAM O. BATES, Jr.